(12) United States Patent
Greving

(10) Patent No.: US 6,323,806 B1
(45) Date of Patent: Nov. 27, 2001

(54) ANTENNA SYSTEM AND METHOD FOR OPERATING AN ANTENNA SYSTEM

(75) Inventor: Gerhard Greving, Untergruppenbach (DE)

(73) Assignee: Airsys Navigation Systems GmbH, Stuttgart (DE)

( * ) Notice: Subject to any disclaimer, the term of this patent is extended or adjusted under 35 U.S.C. 154(b) by 0 days.

(21) Appl. No.: 09/530,971

(22) PCT Filed: Nov. 19, 1998

(86) PCT No.: PCT/IB98/01831
§ 371 Date: May 19, 2000
§ 102(e) Date: May 19, 2000

(87) PCT Pub. No.: WO99/26313
PCT Pub. Date: May 27, 1999

(30) Foreign Application Priority Data

Nov. 19, 1997 (DE) .............................................. 197 51 122

(51) Int. Cl.$^7$ .............................. H01Q 3/22; H01Q 3/24; H01Q 3/26
(52) U.S. Cl. .............................. 342/372; 342/19; 342/383
(58) Field of Search .............................. 342/372, 19, 383

(56) References Cited

U.S. PATENT DOCUMENTS

H740 * 2/1990 Gutleber .............................. 342/384

* cited by examiner

Primary Examiner—Theodore M. Blum
(74) Attorney, Agent, or Firm—Oblon, Spivak, McClelland, Maier & Neustadt, P.C.

(57) ABSTRACT

The invention relates to an antenna installation with an omni-directional antenna (M) and with an auxiliary antenna (A1) the reception signals from which can be combined in respect of amplitude and phase in such a way that a reception miniumu is produced in a desired orientation in space. A further auxiliary antenna (A2) is arranged and can be coupled in such a way that at least one reception minimum is produced where exactly one reception minimum points in the said desired direction in space and coincides with the said reception minimum produced by the first mentioned auxiliary antenna in respect of its orientation and where the attenuations to the reception minimum produced by the first mentioned auxiliary antenna and to the reception minimum produced by at least one of the further auxiliary antennae so that they do not of themselves inhibit the reception of a transmitter sending at a predetermined minimum level, and that the reception minima which coincide in their orientation jointly effect a greater attenuation so that they are suitable for the suppression of jammers. A very narrow reception minimum is produced. In other areas, satellite signals can be received.

8 Claims, 1 Drawing Sheet

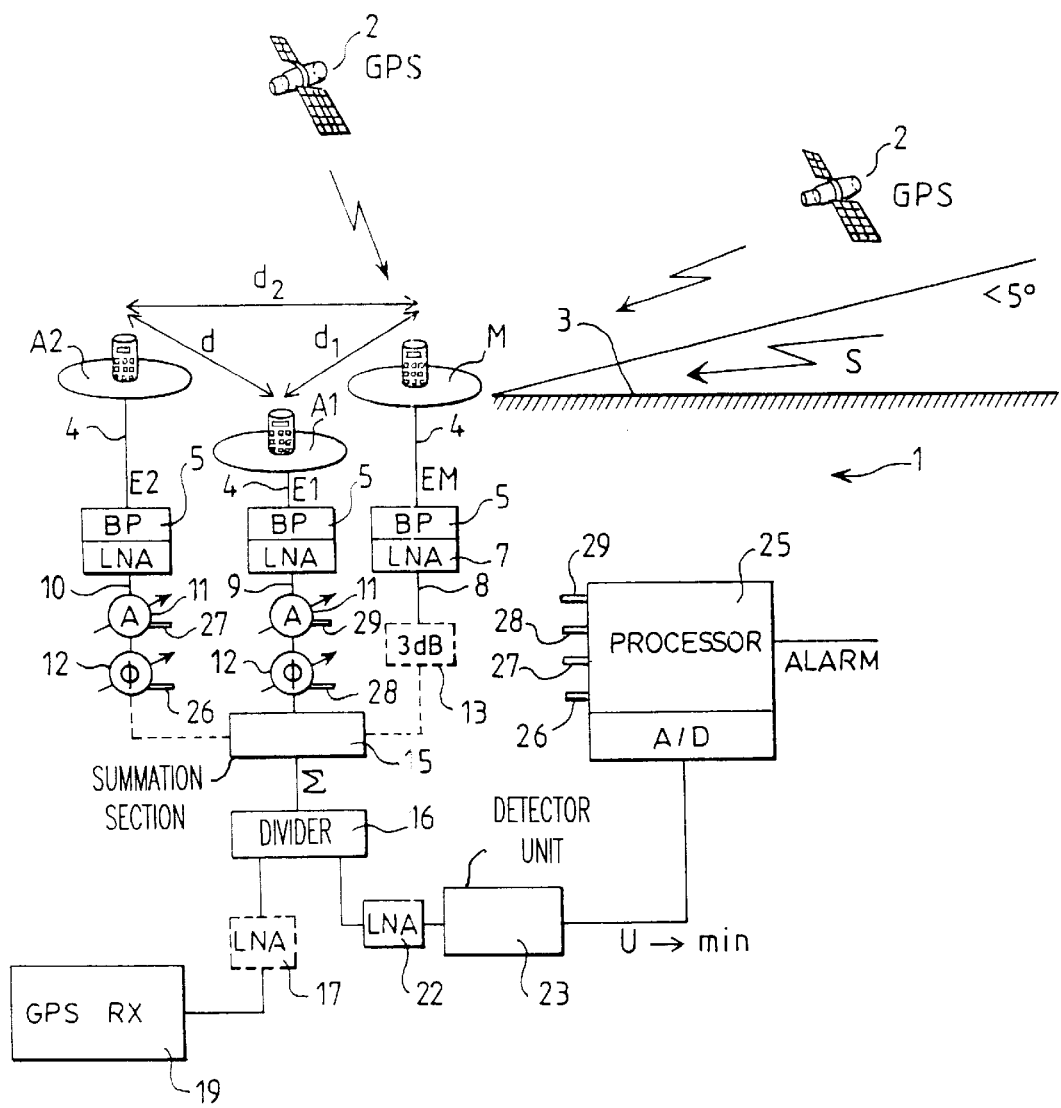

ANTENNA SYSTEM AND METHOD FOR OPERATING AN ANTENNA SYSTEM

BACKGROUND OF THE INVENTION

1. Field of the Invention

The invention relates to an antenna with an omni-directional antenna and with a (first) auxiliary antenna, the received signals of which are combined in respect of amplitude and phase in such a way that a reception minimum results in a desired spatial direction.

2. Discussion of Background

Such an arrangement with two electrically connected antennae and a single reception minimum is known from EP 0 124 047 A2. The reception minimum serves to attenuate the signals from a jammer (jamming transmitter) which is interfering with reception by the antenna installation, sufficiently so that useful signals can be received from a direction other than that of the jammer.

Omni-directional antennae particularly with an almost hemispherical receiving range are well suited for the receipt of signals transmitted from satellites, in particular from satellites traversing the earth's surface. These include, for example, location and navigation satellites, e.g. GPS satellites (GPS=Global Positioning System). It can be assumed that the jamming capacity of the jammer is greater or even very much greater than the capacity of the individual satellites to be received at a ground station. Known modern GPS receivers, certainly tolerate interference levels up to a certain extent greater than the GPS receiving capacity. However, where the interfering capacity is too great, a reduction of the interfering capacity is required.

The use of an omni-directional antenna with a single auxiliary antenna for the production of a single reception minimum produces a funnel shaped reception minimum and not a point reception minimum. The effect of this is that with sufficiently strong suppression of the jamming, reception of a satellite cannot be recieved with suffiecient strength, not only when it is exactly in the same direction as the interference, but also when it is in a spatial angular region in the vicinity of the jammer, due to the strong attenuation of the reception signal.

SUMMARY OF INVENTION

The object of the invention is to provide a possibility in which the spatial angle region with marked attenuation of the reception signal in the neighbourhood of the jammer, more generally the region in the neighbourhood of the spatial direction, in which a reception minimum is to be produced, is reduced, compared with that of known antenna installations. This object is met by the features of Claim 1 and through the features of the independent Claim 7.

In accordance with the invention, the arrangement can be found so that the first named auxiliary antenna in combination with the main antenna produces in operation only a single reception minimum or several reception minima. In addition, the further auxiliary antennae can, in combination with the main antenna, produce only a single reception minimum or several reception minima. It is preferred that one of the auxiliary antennae (in the example the first named auxiliary antenna) produces only a single reception minimum and that other auxiliary antenna produces a plurality of reception minima. The further explanations relate first to this preferred embodiment. Other embodiments will be discussed in the conclusion.

In accordance with the invention both the attenuation which is achieved by the first named auxiliary antenna alone (if necessary in combination with the omni-directional antenna) and the attenuation achieved by the additional auxiliary antennae alone (if necessary again in combination with the omni-directional antenna) are designed in such a way that even in the region of the reception minimum of the first named auxiliary antenna or of all reception minima of the further auxiliary antennae the receipt of the desired useful signals, e.g. of satellites, in particular of location satellites, can still be reliable. Only in an individual spatial direction, namely in that spatial direction in which the first named auxiliary antenna produces a reception minimum, is its reception minimum overlain by one of the reception minima of the additional auxiliary antennae and there produces a strong attenuation in a greatly reduced angular region such that practically only a point jammer of reception by the antenna installation is excluded. In connection with the circulating satellite this means that the signals from a satellite can only not be received in that very short time period in which it may find itself precisely behind the jammer.

One advantage of the invention is that the availability of satellite signals is increased compared with the state of the art so that the invention is suitable in particular even for security relevant installations for example for the continuous provision of precise positioning signals to aircraft approaching an airport.

The first named auxiliary antenna and/or the additional auxiliary antennae may likewise be an omni-directional antenna, in particular with a hemi-spherical receiving range. Here the advantage is that the direction of the combined reception minimum can be set over a wide spatial angular area by electrical means alone (alteration of amplification or attenuation, setting of a suitable phase displacement between the signals and the auxiliary antennae and the omni-directional antenna). It may also be possible, in certain cases, to employ as auxiliary antennae those which already provide a certain directivity, particularly if the jammer is not mobile so that mechanical tracking of the antenna is not necessary. Such antennae are however possibly less suitable for the attenuation of interference signals from other directions. Since a jammer is generally located close to the horizon, those omni-directional antennae which have a reception minimum in the vertically upwards direction can be used as auxiliary antennae.

If several jammers have to be faded out at the same time then, in the simplest case, an additional auxiliary antenna of the first named type and an additional further auxiliary antenna is required for each additional jammer.

BRIEF DESCRIPTION OF THE DRAWING

Further features and advantages of the invention are provided by the following description of an example of an embodiment of the invention in combination with the drawings, which show important details of the invention and also from the claims. The individual features may each be realised individually or gathered in any desired combination in one embodiment of the invention.

The single FIGURE shows partly as a perspective representation and partly as a circuit diagram, a ground station of a satellite supported navigation system GNSS (Global Navigation Satellite System). The antenna installation in accordance with the invention and the process in accordance with the invention are described by means of this FIGURE.

DESCRIPTION OF THE PREFERRED EMBODIMENT

In the example a ground station 1 is designed for the practically simultaneous reception of a plurality of GPS satellites 2 which broadcast time signals in known ways, where the time taken for the signals to reach the location of the receiving station and hence the distance of the satellites concerned from the earth station location can be determined from the time at the location of the receiving station on receipt of the signals and the time impressed on the satellite signals.

It is known that transit time distortions can result from the influences of the ionosphere and/or the troposphere so that the distance values just described are erroneous. To correct these, error correction signals are produced by means of the likewise known differential GPS (DGPS) in the ground station, the location of which in respect of geographical length, breadth and height is precisely measured, by comparison with the actual known satellite distance based on comparison of the appropriate known satellite track. This will be broadcast and evaluated by users. The error correction signals make it possible to reduce the errors brought about by ionospheric effects and also through other effects which could otherwise, without correction, amount to several hundred metres.

It is shown in the drawing that in a region of less than 5° elevation above the horizontal plane marked with the reference symbol 3, interference signals S can be expected which then if no special measures are taken can considerably affect the reception of satellite signals through the ground station even from spatially angular areas far removed from the actual interference.

The earth station 1 has a main antenna M, a first auxiliary antenna A1 and a second auxiliary antenna A2. All antennae are those with an almost hemispherical reception characteristic, i.e. they collect signals from almost all directions lying in the hemisphere above the surface of the earth. They are thus in a position to receive signals even from satellites which are very close to the horizon.

The first auxiliary antenna A1 has a separation d1 from the main antenna M which is smaller than a wavelength of the high frequency radiated from the satellites. Desirably, this separation amounts, for example, to about 0.5–0.6 of a wavelength. In the example d1 is half a wavelength. Because of this relatively small separation a single reception minimum is produced. The second auxiliary antenna A2 has a separation d2 from the main antenna M which is considerably larger than d1. d2 amounts, for example, to 1 to 2 wavelengths. At a distance d2 of more than 1 wavelength several reception minima are produced. In the example, d2 is about 1.5 wavelengths. The separation between the two auxiliary antennae is d and, in the example, is as large as d1 but may take other values.

The output leads from each of the antennae carry signals EM (in the case of the main antenna M) E1 (for the auxiliary antenna A1) and E2 (for the auxiliary antenna A2). The output leads from the three antennae are each led through a band pass (BP) 5, by means of which signals lying outside the frequency range of interest are suppressed, to a low noise amplifier (LNA) 7. The output leads from the low noise amplifier 7 are allocated references 8–10. In the output leads 9 and 10 of the two auxiliary antennae A1 and A2 a digitally controllable electronic amplification/attenuation section 11 which alters the amplitude (namely increasing or decreasing) and a phase altering digital digitally controllable phase section 12 are connected. If required, an attenuation section 13 can be incorporated in the output lead 8 from the main antenna M. The signals on the leads 8–10 changed in amplitude and phase and if necessary through the attenuation section 13 are fed to a summation section 15. A divider 16 leads part of the combined signal, if necessary through a low noise amplifier 17, to a GPS receiver 19 and further electronic devices of the ground station 1 to produce the above mentioned correction signal.

As a result of the above mentioned mutual separation of the antennae the first auxiliary antenna A1 together with the main antenna M is in a position, through alteration of the amplitude and phase on the output lead 9 of the first auxiliary antenna to produce a single reception minimum in a desired direction in space. The second auxiliary antenna A2 can, because of its greater separation from the main antenna M, combine with the latter to produce a plurality of reception minima, in such a way that one of these points in a desired direction in space where a jammer is located.

Another part of the combined signal is fed from the divider 16 likewise through a low noise amplifier 22 and a detector unit 23 to a processor 25, which is controlled by a programme in such a way that it can, through the control leads 26, 27, 28 and 29 adjust the controllable amplification/attenuation section 11 and phase section 12 of the two auxiliary antenna in such a way that a signal minimum appears at the output of the detector unit 23. In this way, the output signal from the auxiliary antennae A1 and A2 is systematically attenuated RF-wise in amplitude and phase by the digitally controllable electronic attenuation unit in such a way that the interference signal in the aggregate signal after the adder 15 is adequately reduced. This is done by minimising the part signal sent to the detector unit 23 by means of the locked loop controlled by the processor 25. In doing so, however, care is taken that an adequate attenuation to suppress the jammer is achieved, neither by the first auxiliary antenna alone nor through the second auxiliary antenna alone each in conjunction with the main antenna since this will result in the production of too wide a reception minimum, as explained above.

A minimum in the total signal from the three antennae means that the signal from a jammer which contributes to the intensification of the total signal, has been eliminated to the greatest extent.

The single reception minimum of the first auxiliary antenna A1 then points directly in the direction of the jammer, when a minimum is found at the output of the detector unit (it is assumed that there is only a single jammer). One of the reception minima of the second auxiliary antenna A2 likewise points to the jammer when a minimum is reached in the signal sent to the detector unit 23. From all other regions of space, satellite signals can be received either completely unattenuated or, in the region of the other (not pointing to the jammer) minima of the second antenna, partially attenuated, where this attenuation is at no place so great that receipt of the relevant satellite is prevented.

The minima from the other auxiliary antennae are therefore narrower and sharper compared with the single minimum of the first named auxiliary antenna, since the separation d2 is greater than a wavelength.

With the automatic elimination of the jammer an adaptive algorithm is executed by means of the processor 25 which, even without prior knowledge of the position of the jammer, causes the antenna to be adjusted exactly so that the influence of the jammer is reduced to the greatest extent.

The arrangement can be made in such a way that in the absence of any interfering signals, the output signals to the leads 26–29 of the processor 25 are adjusted in such a way that the output signals from the auxiliary antennae A1 and A2 undergo maximal attenuation so that only the output signal from the main antenna M is evaluated. In the case of interference, values which deviate from this will be adjusted by the processor so that the value e.g. on line 27 (control signal for setting the attenuation of the output signal from the first auxiliary antenna) can be used as an alarm and interference criterion.

Only a few parameters must be electronically altered by the locked loop so that this can be done in a very short space of time. If the amplitude and phase resolution is high enough (4 to 6 bits) it is easily possible to reduce the interfering signal by 20 dB to 30 dB.

The attenuation through the first auxiliary antenna alone amounts, for example, to a maximum of 10 dB. The combination of both the minima directed to the jammer leads to a very deep and narrow minimum. On the other hand, tolerable narrow minima (i.e. not preventing satellite reception) are produced in the other minimum angle regions.

In the example, the ground station of a GPS system was described. The above designs are however, applicable to other systems which employ satellites.

The ground station in accordance with the invention and the process in accordance with the invention for operating the ground station for satellite controlled navigation and landing systems will be clearly improved by the proposed measures. An alarm criterion can be derived immediately in the event of interference. In the event of interference, the direction of the jammer can be derived by evaluating the control signals for the attenuation section and the phase section of the first auxiliary antenna.

In a further embodiment differing from the example described both the first named auxiliary antenna and also the further auxiliary antenna both produce only a single reception minimum each of which is adjusted to suppress one jammer. In particular, in this case, the auxiliary antennae may be arranged at approximately equal distance from the omni-directional antenna (main antenna). Here the total effective reception minimum is not quite as narrow and sharp as in the example described above.

Again in a further embodiment, each of the auxiliary antennae produces a plurality of reception minima. From each auxiliary antenna a single minimum is directed at the jammer. The total effective minimum here may be advantageously extremely narrow and acute. However, in setting up and/or operating the installation particular care is required to prevent minima from the two auxiliary antennae overlapping in spatial directions in which is jammer is not present and thus inhibiting the reception of satellite signals.

The invention relates to an antenna installation with an omni-directional antenna M and with an auxiliary antenna A1, the reception signals from which are combined in respect of amplitude and phase so as to produce a reception minimum in a desired direction in space. An additional auxiliary antenna A2 is arranged and can be connected in such a way that at least one reception minimum is produced where exactly one reception minimum point in the said desired direction in space and coincides in respect of its orientation with the said reception minimum from the first named auxiliary antenna and where the attenuations to the reception minimum produced by the first named auxiliary antenna and the reception minimum produced on at least one of the further auxiliary antennae is such that it does not inhibit for each alone the reception of a transmitter sending at a predetermined minimum level, and that the reception minima coinciding in their orientation jointly effect a greater attenuation, in such a way that they are suitable for the suppression of jammer. A very narrow reception minimum is produced. In the other areas, satellite signals can be received.

What is claimed is:

1. Antenna installation for suppressing a jammer, comprising:
    an onmi-directional main antenna configured to receive main reception signals from a transmitter sending a transmitter signal at a predetermined minimum level and a jamming signal from the jammer;
    a first auxiliary antenna configured to receive first auxiliary reception signals including the transmitter signal and the jammer signal;
    a second auxiliary antenna arranged and configured to receive second auxiliary reception signals including the transmitter signal and the jammer signal; and
    a signal processing mechanism configured to adjust amplitudes and phases of the reception signals from the first auxiliary antenna, to adjust amplitudes and phases of the reception signals from the second auxiliary antennae, and to combine together an adjusted reception signal from the first auxiliary antenna, an adjusted reception signal from the second auxiliary antenna and the reception signal from the main antenna to produce a minimum of the jamming signal without inhibiting reception of the transmitter signal and so that the adjusted reception signals from the first and second auxiliary antennae jointly suppress the jamming signal in the reception signal from the main antenna.

2. Antenna installation in accordance with claim 1, wherein the first auxiliary antenna in conjunction with the main antenna is configured to produce precisely one reception minimum and that the second auxiliary antenna together with the main antenna is configured to produce a plurality of reception minima in orientations in space.

3. Antenna installation in accordance with claims 1 or 2, wherein the second auxiliary antenna is further removed from the main antenna than the first auxiliary antenna.

4. Antenna installation in accordance with claims 1 or 2, further comprising:
    plural first and several second auxiliary antennae configured to provide suppression of several jammers.

5. Antenna installation in accordance with claims 1 or 2, wherein at least one of the first and second auxiliary antennae has omni-directional characteristics.

6. Antenna installation in accordance with claims 1 or 2, wherein the first auxiliary antenna is spaced a distance less than one wavelength away from the main antenna.

7. Antenna installation in accordance with claims 1 or 2, wherein the second auxiliary antenna is spaced from the main antenna a distance which is at least one wavelength.

8. Method for receiving a transmission signal at a predetermined signal level from a GPS satellite, comprising:
    providing an antenna installation including an omnidirectional main antenna, a first auxiliary antenna, and a second auxiliary antenna;
    receiving reception signals including the transmission signal and at least one jamming signal on the main antenna, the first auxiliary antenna, and the second auxiliary antenna;
    adjusting amplitudes and phases of the reception signals from the first auxiliary antenna and from the second auxiliary antennae; and
    combining together an adjusted reception signal from the first auxiliary antenna, an adjusted reception signal from the second auxiliary antenna and the reception signal from the main antenna to produce a minimum of the jamming signal without inhibiting reception of the transmitter signal and so that the adjusted reception signals from the first and second auxiliary antennae jointly suppress the jamming signal in the reception signal from the main antenna.

* * * * *